*Thomas W. Houchin*
*Vermin Exterminator*
No. 120,197.                              Patented Oct. 24, 1871.
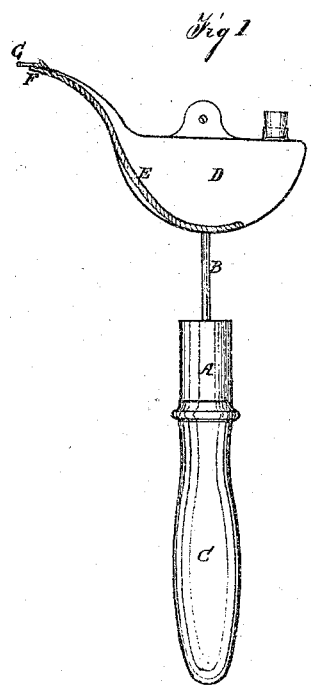
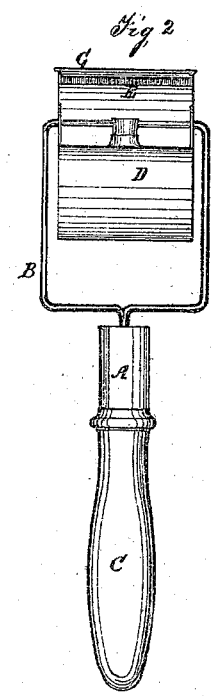

UNITED STATES PATENT OFFICE.

THOMAS W. HOUCHIN, OF MORRISANIA, NEW YORK.

IMPROVEMENT IN VERMIN EXTERMINATORS.

Specification forming part of Letters Patent No. 120,197, dated October 24, 1871.

*To all whom it may concern:*

Be it known that I, THOMAS W. HOUCHIN, of Morrisania, Westchester county, New York, have invented a new and Improved Vermin Exterminator, of which the following is a full, clear, and correct description, reference being had to the accompanying drawing making a part of this specification, and to the letters of reference marked thereon, in which—

Figure 1 is a sectional view of my vermin exterminator; Fig. 2 is an end view of the same.

In the drawing like parts of the invention are pointed out by the same letters of reference.

The nature of the present invention consists in the construction, as more fully hereinafter set forth, of an improved vermin exterminator for exterminating vermin, which shall be simple in construction and effective in operation.

To enable those skilled in the arts to make and use my invention, I will proceed to describe its construction and operation.

A shows a base-plate, in the upper portion of which are inserted the ends of the wire framework B, and in the lower portion of which is secured one end of a handle, C, made of wood or any suitable material, which handle may be made of the proper length. Hung upon the cross-brace of the frame B is a reservoir, D, to receive alcohol or other fluid and a wick, E. The forward portion of this reservoir for the alcohol or other fluid curves upward and outward, and is provided with a lip, F, projecting beyond the face, so to speak, of the wick E, and also with a guard, G, placed slightly in advance of the lip, and corresponding in width with the lip F. The reservoir D is hung upon the frame B so that it is free to turn upon the same, and will thus always retain a level position.

Such being the construction, the operation is as follows: The reservoir D is filled or partially filled with alcohol or other fluid; the wick E is inserted in the same, its forward end projecting a slight distance beyond the mouth of the reservoir, but not beyond the lip F. The wick may then be lighted, and the implement is moved rapidly up and down a wall, or beneath a ceiling, or alongside of an article of furniture, and the insects will be singed or destroyed by the flame. The lip F prevents the fluid flowing through the wick E and dropping from the reservoir while the implement is moved in any direction, while the guard G protects the wall, ceiling, or article of furniture, from contact with the charred wick.

By the use of my exterminator, mosquitoes, flies, roaches, and other vermin are rapidly destroyed, and when so desired my invention can be employed as a fumigator for purifying the air in sick rooms, carbolic acid or other volatile or purifying preparations being employed with the alcohol.

Having thus set forth my invention, what I claim as new, is—

The combination of a reservoir D, provided with a projecting lip, F, and guard G, with a frame-work, B, and handle C, substantially as and for the purposes set forth.

THOS. W. HOUCHIN.

Witnesses:
  A. SIDNEY DOANE,
  WM. HASTINGS.      (143)